(12) United States Patent
Jeoung et al.

(10) Patent No.: US 9,176,270 B2
(45) Date of Patent: Nov. 3, 2015

(54) LIGHT-DIFFUSING INK COMPOSITION AND LIGHT GUIDE PANEL USING SAME

(75) Inventors: Sung-Don Jeoung, Yangsan-si (KR); Sang-Soo Kang, Yangsan-si (KR)

(73) Assignee: KSCB CO., LTD., Yangsan-si, Gyeongsangnam-do (KR)

( * ) Notice: Subject to any disclaimer, the term of this patent is extended or adjusted under 35 U.S.C. 154(b) by 62 days.

(21) Appl. No.: 13/884,376

(22) PCT Filed: Nov. 10, 2011

(86) PCT No.: PCT/KR2011/008585
§ 371 (c)(1),
(2), (4) Date: May 9, 2013

(87) PCT Pub. No.: WO2012/064136
PCT Pub. Date: May 18, 2012

(65) Prior Publication Data
US 2013/0229824 A1 Sep. 5, 2013

(30) Foreign Application Priority Data

Nov. 10, 2010 (KR) .......................... 10-2010-0111380

(51) Int. Cl.
*F21V 8/00* (2006.01)
*C09D 11/03* (2014.01)
*C09D 11/106* (2014.01)

(52) U.S. Cl.
CPC .............. *G02B 6/0035* (2013.01); *C09D 11/03* (2013.01); *C09D 11/106* (2013.01); *G02B 6/006* (2013.01); *G02B 6/0043* (2013.01)

(58) Field of Classification Search
CPC .... C09D 11/03; C09D 11/106; G02B 6/0035; G02B 6/0043; G02B 6/006
See application file for complete search history.

(56) References Cited

U.S. PATENT DOCUMENTS 6,180,315 B1 * 1/2001 Schadeli et al. .............. 430/200
2004/0169936 A1 * 9/2004 Taniguchi et al. ............ 359/722

FOREIGN PATENT DOCUMENTS

| KR | 10-2006-0051832 A | 5/2006 |
| KR | 10-2008-0111786 A | 12/2008 |
| KR | 10-0943233 B1 | 2/2010 |

* cited by examiner

*Primary Examiner* — Thomas M Sember
(74) *Attorney, Agent, or Firm* — Paratus Law Group, PLLC

(57) ABSTRACT

The present invention relates to a light-diffusing ink composition and to a light guide panel and display unit using same, wherein the light-diffusing ink composition comprises: an ink binder made of one or more selected from a group consisting of acrylic resin and polyvinyl chloride (PVC) copolymer; polymethylmethacrylate (PMMA) particles for forming a crystal optical pattern; and a solvent for ink. According to the present invention, light from a light source is converted into a crystal optical pattern and outputted, thus producing aesthetic and sensuous light, and lighting with an aesthetic design can be achieved by means of the light guide panel using the composition.

10 Claims, 4 Drawing Sheets

LIGHT-DIFFUSING INK COMPOSITION AND LIGHT GUIDE PANEL USING SAME

CROSS REFERENCE TO PRIOR APPLICATION

This application is a National Stage Patent Application of PCT International Patent Application No. PCT/KR2011/008585 (filed on Nov. 10, 2011) under 35 U.S.C. §371, which claims priority to Korean Patent Application No. 10-2010-0111380 (filed on Nov. 10, 2010), which are all hereby incorporated by reference in their entirety.

TECHNICAL FIELD

The present invention relates to a light-diffusing ink composition, and more particularly, to an ink composition applied to a light guide panel and forming a light diffusive layer for light emitted from a light source, and a display unit using the same to display an image.

BACKGROUND ART

In general, a light guide panel is a part for receiving light from a light source and emitting light in the form of surface light having uniform brightness, and constitutes a backlight unit (BLU) of a liquid crystal display (LCD).

Referring to FIGS. 1 and 2, when a light guide member 4 used in manufacture of the light guide panel, for example, a light guide plate or a light guide film made of plastic, glass or the like is carved to form a pattern 8 of scratches or dots on a surface of the light guide member by laser machining, the pattern 8 scatters/refracts/reflects light emitted from the light source 3, thereby allowing the light guide panel to emit illumination light in the form of surface light.

However, since the light guide panel manufactured by laser machining simply emits light from the light source in the form of surface light with the same color as the light emitted from the light source 3, the surface light becomes monotonous and is not aesthetically pleasing.

Recently, a light guide panel has developed to scatter/reflect light emitted from the light source 3 by printing a light-diffusing ink on the light guide member 4 and forming a pattern 8 of dots on the surface of the light guide member 4. However, such a light guide panel using the light-diffusing ink simply scatters/reflects light of the light source at a portion on which the light-diffusing ink is printed, with the same color and uniform brightness, whereby the light guide panel itself cannot output aesthetically pleasing light. Although the light-diffusing ink generally improves brightness, there is a limit in application of the light guide panel to various fields besides the backlight unit.

In other words, a conventional light guide panel and, more particularly, the light guide member 4 has been applied to a backlight unit that uniformly illuminates a substrate of a liquid crystal display, or that is placed behind an image sheet 2 having a certain image, for example, a photo or picture sheet for a billboard or decoration board and illuminates a certain portion of the image sheet 2 with the same color as the light emitted from the light source 3.

Accordingly, the present inventor has developed a light-diffusing ink composition and a light guide panel using the same, which can convert light from a light source into aesthetic and sensuous light, and a light guide panel including a light-diffusing ink image and outputting an optical pattern image.

DISCLOSURE

Technical Problem

The present invention is directed to solving the problems of the related art as described above, and one aspect of the present invention is to provide a light-diffusing ink composition and a light guide panel using the same, which can output a crystal light pattern, thus providing an aesthetically pleasing appearance.

Another aspect of the present invention is to provide a light guide panel, which can output a display image printed with a light-diffusing ink composition corresponding to a predetermined design, that is, a light guide panel capable of outputting a display image instead of illuminating an image sheet from behind.

A further aspect of the present invention is to provide a light-diffusing ink composition, which can provide a display image with various colors and shapes to a light guide panel, and the light guide panel which can output a color image realized by the same.

Technical Solution

In accordance with one aspect, the present invention provides a light-diffusing ink composition, which includes: an ink binder formed of at least one selected from the group consisting of an acrylic resin and a polyvinyl chloride (PVC) copolymer; polymethyl methacrylate (PMMA) particles for forming a crystal light pattern; and a solvent for ink.

Here, the PMMA particles may include PMMA beads having an average particle size of 10 μm to 50 μm. More particularly, the PMMA beads have an average particle size of 15 μm to 20 μm.

The ink binder and the PMMA particles may have substantially the same index of refraction. Here, the PMMA particles may have an index of refraction of 1.49.

The solvent for ink may include at least one selected from the group consisting of ketones, esters, ethers, hydrocarbons, and glycol ether organic solvents.

The composition may include 100 parts by weight to 590 parts by weight of the ink binder and 160 parts by weight to 1000 parts by weight of the solvent for ink, based on 100 parts by weight of the PMMA particles.

The light-diffusing ink composition may further include a color pigment for imparting color. The color pigment may include a transparent color pigment.

The color pigment may include at least one selected from the group consisting of Quinacridone red C.I. pigment violet 19, C.I. pigment R 177 (red), CI Pigment G36 (green), C.I. pigment B15:6 (blue), C.I. Pigment Y139 (yellow), and CI Pigment V23 (violet).

The color pigment may be added in an amount of 8 parts weight to 170 parts by weight based on 100 parts by weight of the PMMA particles.

In accordance with another aspect, the present invention provides a light guide panel, which includes: a light-diffusing layer formed of the light-diffusing ink composition according to any one of claims 1 to 10; and a light guide member including the light-diffusing layer.

The light guide member may include a display image formed by the light-diffusing layer on a surface of the light guide member as the light-diffusing ink composition is printed on the surface of the light guide member corresponding to a preset design, and the display image of the crystal light pattern may be output in front of the light guide member as the light guide member is illuminated by a light source.

Advantageous Effects

In accordance with embodiments of the invention, a light-diffusing ink composition and a light guide panel using the same have the following effects.

According to the embodiments of the invention, a light-diffusing ink composition may be used to convert light from a light source into a crystal light pattern and output, thereby producing aesthetics and sensuous light, and may be applied to a light guide panel to realize an aesthetically pleasing lighting design.

According to the embodiments of the invention, a colored light-diffusing ink composition may be used to form a colored crystal pattern and realize a mixed color together with the color of the light source, thereby outputting a crystal light pattern with various colors.

According to the embodiments of the invention, while the light-diffusing ink composition forms a light-diffusing layer on the light guide panel, a colored and/or colorless light-diffusing ink composition may be used to form a display image having a desired design on the light guide panel, whereby the light guide panel can output an aesthetically pleasing and beautiful design through the crystal light pattern.

According to the embodiments of the invention, without stacking a separate image sheet on a front side of the light guide panel, it is possible to manufacture a display panel for decorative plates, signboards, billboards, and the like with a predetermined design image, thereby reducing the number of components while reducing product thickness and weight. Furthermore, a decorative image or advertisement image having a predetermined design, for example, a picture, a logo, a character, a symbol, and the like to be applied to the light guide panel is illuminated and aesthetically output with a colored and/or colorless design.

BEST MODE

Figure 1:
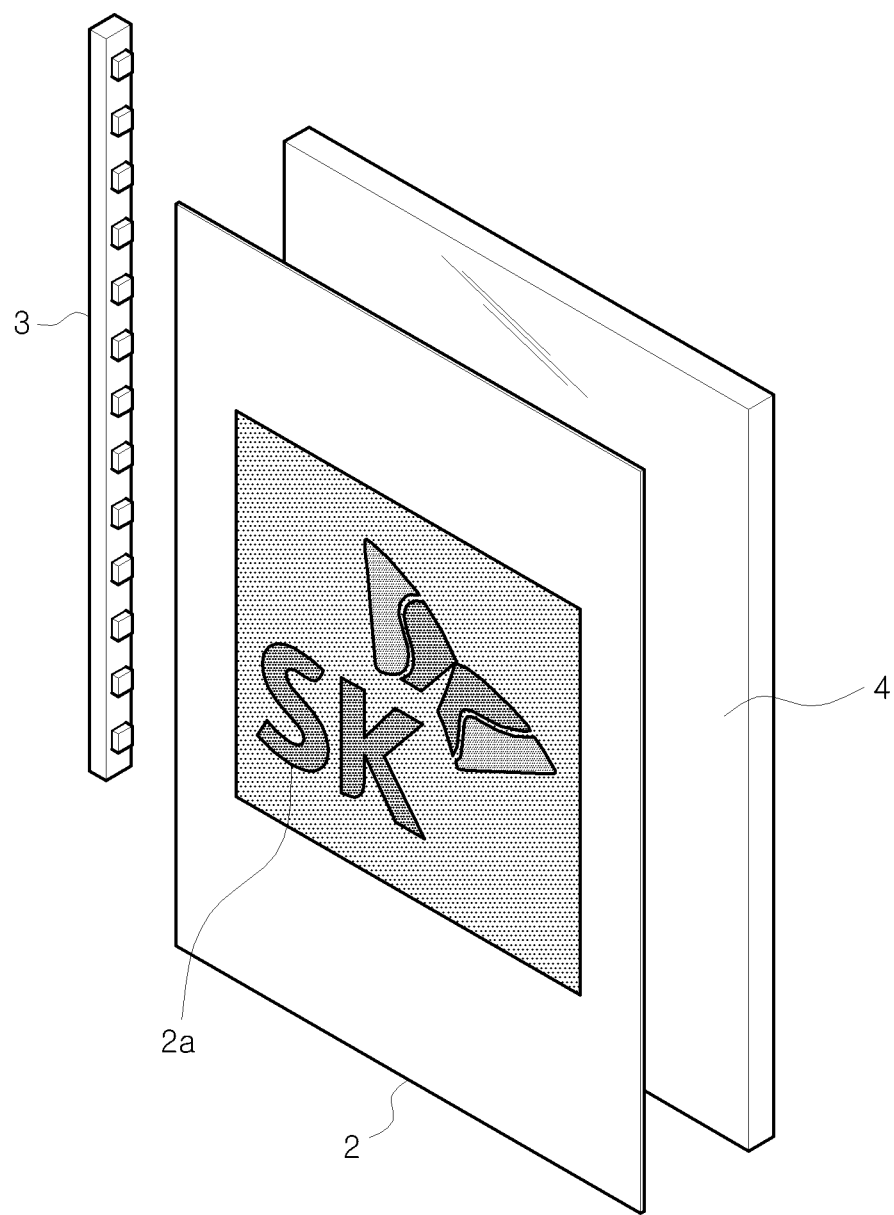
FIG. 1 is an exploded perspective view of one example of a conventional display unit.
Figure 2:
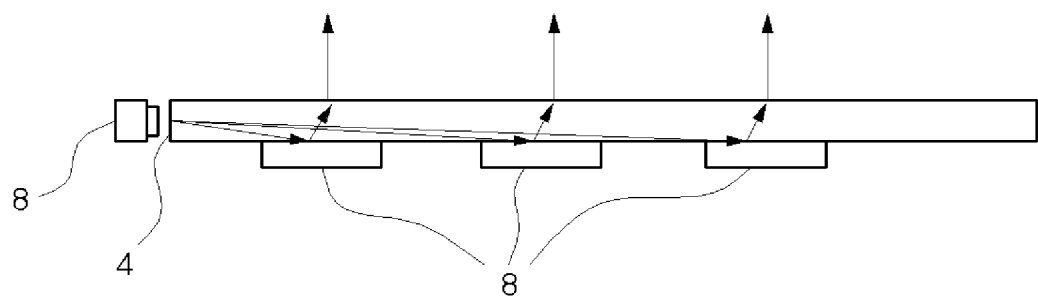
FIG. 2 is a cross-section view of a backlight unit provided to the display unit of FIG. 1.

Hereinafter, exemplary embodiments of the present invention will be described in more detail.

A light-diffusing ink composition according to one embodiment of the invention includes an ink binder, a light diffuser, and a solvent for ink. Here, the light-diffusing ink composition may further include additives.

The ink binder may include at least one selected from the group consisting of an acrylic resin and a polyvinyl chloride (PVC) copolymer. Therefore, the ink binder may include at least one of the acrylic resin and the polyvinyl chloride (PVC) copolymer.

Next, the solvent for ink may be formed of at least one selected from the group consisting of ketones, esters, ethers, hydrocarbons, and glycol ether organic solvents. Examples of the ketone solvents may include isophorone, cyclohexanone, and the like; examples of the ester solvents may include butyl carbitol acetate, ethyl carbitol acetate, and the like; and examples of the ether solvent may include butyl carbitol, ethyl carbitol, and the like.

Further, examples of the hydrocarbon solvent may include Aromatic 150, Aromatic 200, and the like; and examples of the glycol ether solvent may include butyl cellosolve, ethyl cellosolve, and the like.

In preparation of the solvent for ink, these solvents may be used alone or in combination thereof.

The light diffuser may include polymethyl methacrylate (PMMA) particles, in particular, PMMA beads, and may be applied to a mixture of the ink binder and the solvent for ink, thereby realizing a crystal light pattern, for example, functionality, such as the provision of feeling of crystal glass.

Specifically, the PMMA particles may include PMMA beads having an average particle size of 10 μm to 50 μm. More preferably, the PMMA beads have an average particle size of 13 μm to 30 μm, in particular, 15 μm to 20 μm to output a desirable crystal light pattern.

For light diffusion using ink, the PMMA beads may have an average particle size of less than 10 μm. In this case, a haze value is lowered to cause monotonous emission of light from a light source, thereby making it difficult to achieve a desired crystal light pattern, or providing an unclear crystal light pattern.

In more detail, the light-diffusing ink composition is screen-printed on the light guide member (111 in FIG. 3) and dried to form a light-diffusing layer thereon. When the average particle size of the PMMA beads is less than 10 μm, the PMMA beads can be immersed in the acrylic binder having the same index of refraction as the PMMA beads, causing deterioration in light-diffusing effects. That is, a low haze value is obtained. On the contrary, when the average particle size of the PMMA beads exceeds 10 μm, the light-diffusing layer, that is, a printing surface, can form an uneven surface like an uneven glass surface (embossing), whereby light from the light source can be refracted by the uneven surface, thereby outputting the crystal light pattern.

Further, the PMMA beads may have an average particle size of greater than 50 μm. In this case, however, screen-mesh drainage of the ink composition can become inefficient. Preferably, the PMMA beads have an average particle size of 15 μm to 20 μm in consideration of screen-mesh drainage and a haze phenomenon due to overlap of the particles.

The ink binder may include a polyvinyl butyral (PVB) resin, a cellulose acetate butyrate (CAB) resin, and the like. A vinyl chloride copolymer having an index of refraction of about 1.48 and/or an acrylic resin having an index of refraction of about 1.49 may be used as the ink binder. When the ink binder and the PMMA particles have the same index of refraction, the crystal light pattern can be effectively achieved.

In this embodiment, the PMMA particles having an index of refraction of 1.49, in particular, the PMMA beads are used as the light diffuser, and the acrylic resin having an index of refraction of 1.49 is used as the ink binder. Such an acrylic resin can be readily available and is excellent in applicability to the ink binder.

The crystal light pattern may be effectively achieved when the light diffuser has the same index of refraction as the ink binder. However, instead of the PMMA beads, polybutyl methacrylate (PBMA) beads or other spherical beads having a similar index of refraction, in particular, a light diffuser having substantially the same index of refraction as the ink binder may be used.

Based on 100 parts by weight of the PMMA particles, 100 parts by weight to 590 parts by weight of the ink binder and 160 parts by weight to 1000 parts by weight of the solvent for ink are mixed. If the amount of PMMA particles exceeds this range, the total quantity of light transmittance can be lowered due to the overlap of the PMMA particles. On the other hand, if the amount of PMMA particles is relatively insufficient, the light-diffusing effects can be lowered.

Further, 40 parts by weight to 90 parts by weight (41.6 to 87.5 parts by weight) of the ink binder, i.e., the acrylic resin and/or vinyl chloride copolymer, is mixed with 100 parts by weight of the solvent for ink, but the present invention is not limited thereto. For reference, the mixture of the solvent and the ink binder (e.g., the acrylic resin) may have a viscosity of about 6,000 cps to 20,000 cps at 25° C. to facilitate screen-printing of the light-diffusing ink composition.

To impart color to the light-diffusing ink composition according to the embodiments, the composition may further include a color pigment. The color pigment may include a transparent pigment.

For example, the color pigment may include at least one selected from among Quinacridone red C.I. pigment violet 19, C.I. pigment R 177 (red), C.I. Pigment G36 (green), C.I. pigment B15:6 (blue), C.I. Pigment Y139 (yellow), and C.I. Pigment V23 (violet). When different color pigments selected from among these color pigments are mixed, a mixed color may be obtained.

In this case, 8 parts by weight to 170 parts by weight of the color pigment is mixed with 100 parts by weight of the PMMA particles. In more detail, 20 parts by weight to 140 parts by weight of the color pigment are mixed with 100 parts by weight of the PMMA particles. Conventionally, the color of light emitted from the light guide panel depends on the color of the light source. However, in this invention, the color pigment is added to the light-diffusing ink composition, thereby making it possible to produce a light guide panel capable of emitting light of various colors.

Further, with the colored and/or colorless light-diffusing ink composition, it is possible to manufacture a display unit in which various display images, such as persons, objects, various logos, and the like, are formed on the surface of the light guide panel 110, in particular, on the light guide member 111 in accordance with preset designs.

Figure 3:
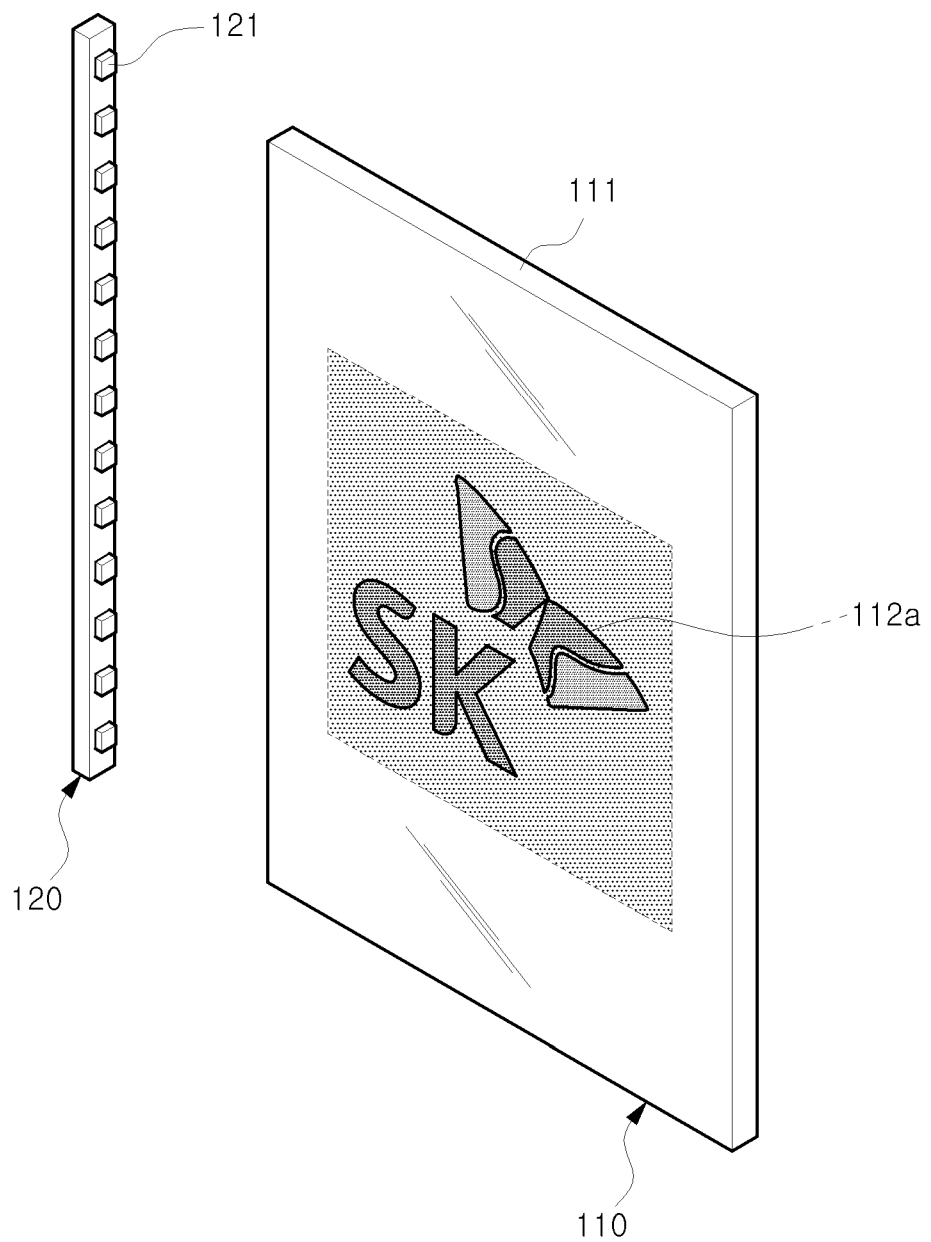
FIG. 3 is an exploded perspective view of a display unit having a light emission image provided by a light-diffusing ink composition according to one embodiment of the present invention.
Figure 4:
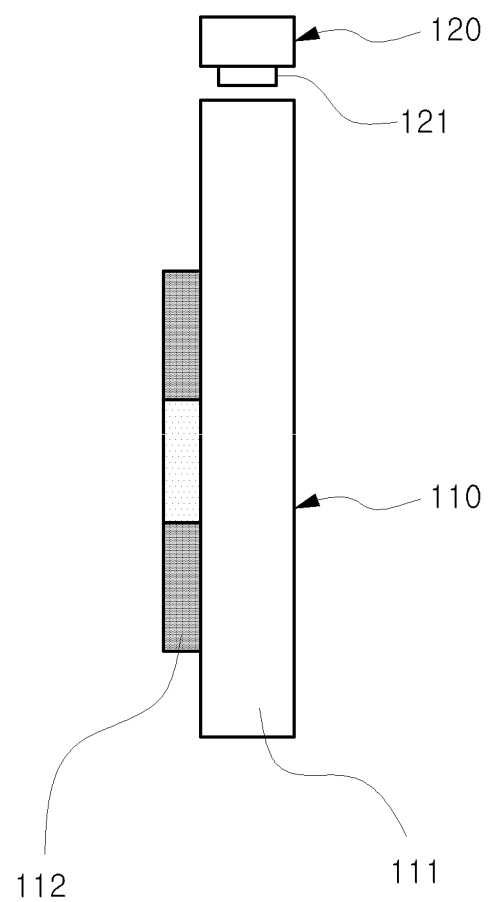
FIG. 4 is a schematic cross-sectional view of the display unit of FIG. 3.

Referring to FIGS. 3 and 4, the display unit includes a light guide panel 110 and a light source 120, in which the light guide panel 110 includes a light guide member 111 and a light-diffusing layer 112. Here, the light-diffusing layer 112 receives light from the light source 120 and outputs a display image 112a of the crystal light pattern in front of the light guide panel 110.

In other words, the light guide panel 110 includes the display image 112a corresponding to a predetermined design, which is illuminated by the light source 120. Here, the light-diffusing ink composition is printed on the surface of the light guide member 111 corresponding to the design of the display image 112a, more particularly, on the rear surface of the light guide member to form the light-diffusing layer 112, whereby the display image 112a can be exhibited in the crystal light pattern. That is, the display image 112a provides a crystal appearance.

Therefore, the light-diffusing layer 112 may be integrated with the surface of the light guide member 111 to match with the design of the display image. In this case, the light-diffusing layer 112 and the display image 112a have the same appearance. Further, the display image 112a may be a color image. The light-diffusing ink composition to be printed on a colored portion of the display image 112 includes a color pigment. Therefore, the light-diffusing layer of the light guide panel may be a monochrome or color image.

The display image 112a may include logos, billboards, photographs, marks, symbols, characters, signs, etc., and the light-diffusing ink composition is printed on the surface of the light guide member 111 according to a predetermined design. The light-diffusing layer 112 formed on the surface of the light guide member 111 by printing the light-diffusing ink composition thereon has a shape of a logo, billboard, photograph, mark, symbol, character, sign, and the like.

In more detail, according to one embodiment, the display image 112a is made of the same material as the light-diffusing ink, and the light-diffusing ink composition is coated on the surface of the light guide member 111 (for example, by silk screen printing) to form the light-diffusing layer 112. The light-diffusing layer 112 converts light from the light source 120 through scattering/reflection/refraction and outputs the display image 112a as crystal surface light in a frontward direction of the light guide panel 110.

The light source 120 may employ a white LED and/or a colored LED in consideration of power consumption. For example, plural light emission elements 121, i.e. LEDs, may be arranged along a lateral edge of the light guide panel 110, thereby providing illumination. The light emission lamps 121 may be configured to emit light simultaneously, sequentially or alternately. Further, the light of the light source 120 and the color of the light-diffusing layer 112 may be mixed to provide a mixed color.

In more detail, the illumination light of the light source 120 enters an edge (an incident portion) of the light guide panel 110 and arrives at the light-diffusing layer 112 through the light guide panel 110. The light-diffusing layer 112 changes the direction of the light emitted from the light source, thereby outputting the display image 112a in front of the light guide panel 110.

At this time, the light-diffusing layer 112 made of the light-diffusing ink converts the light (i.e., the illumination) of the light source transmitted through the light guide member 110 into surface light by scattering/reflection/refraction or the like. Since the light-diffusing layer 112 is printed on the light guide member 111 according to the preset design of the display image, the display image 125 is output in front of the light guide panel 110 in the form of the crystal light pattern.

In conclusion, according to the invention, the illumination light from the light source 120 is converted into the display image 125 by the light-diffusing layer 112 of the light guide panel 110 and thus output in the form of a crystal light image.

According to the invention, the light guide panel may provide the display image in the crystal light pattern as the light guide panel 110 is illuminated with the light from the light source 120, thereby improving aesthetic and deign senses. Further, through elimination of a conventional image sheet, it is possible to provide a display apparatus for various devices and objects, for example, billboards, signboards, other decoration boards, and the like, using a transparent light guide member having a simple configuration, such that the devices or the objects can be clearly expressed through the light guide member.

For example, when an image of a company logo, a billboard, a person and other objects is printed on the surface of the light guide member 111 using the light-diffusing ink composition according to a predetermined design, the light guide panel 110 receives light from the light source 120 and presents an aesthetically pleasing image.

Here, the light guide panel 110 may include a plate made of plastics or glass. As a specific example of the plastics, there are various materials, such as polymethyl methacrylate (PMMA), poly carbonate (PC), polystyrene (PS), etc. That is, the light-diffusing ink composition is printed on a sheet made of PMMA, PC or other materials by silk screen printing to form a light-diffusing layer corresponding to an image of a predetermined design, that is, a preset design, thereby realizing a display panel for billboards, signboards, decorations, and the like.

The light-diffusing layer 112 for realizing the display image 112a may be divided into a plurality of sections and be partially illuminated by light sources emitting different colors.

The light-diffusing ink composition may include at least one type of additive selected from, for example, antifoaming agents, dispersants, leveling agents, and the like. For example, the additive may be present in an amount of 4 parts by weight to 35 parts by weight based on 100 parts by weight of the PMMA beads, without being limited thereto.

In one embodiment, the light-diffusing ink composition may include 25 wt % to 35 wt % of an ink binder including an acrylic resin and/or a vinyl chloride copolymer, 6 Wt % to 25 wt % of a light diffuser including PMMA beads having an average particle size of 10 μm to 50 μm, in particular, 15 μm to 20 μm, 40 wt % to 60 wt % of a solvent for ink including at least one selected from among ketones, esters, ethers, hydrocarbons and glycol ether solvents; 1 wt % to 2 wt % of additives; and 2 wt % to 10 wt % of a color pigment.

Next, the present invention will be described with reference to some examples. Here, it should be understood that these examples are provided for illustration only and do not limit the scope of the invention.

Examples 1 and 2 and Comparative Examples 1 and 2

In Examples 1 and 2 and Comparative Examples 1 and 2, each of light-diffusing ink compositions was prepared according to a composition as listed in Table 1 and printed on a 1 cm thick light guide member, thereby preparing a light guide panel.

TABLE 1

| Component | Example 1 | Example 2 | Comparative Example 1 | Comparative Example 2 | Remarks |
|---|---|---|---|---|---|
| A-21 | 30 | 30 | 30 | 30 | Acrylic resin (molecular weight: 120,000) (Rohm & Haas) |
| Isophorone | 30 | 30 | 30 | 30 | Ketone Solvent (boiling point: 210° C.) |
| Butyl carbitol acetate | 23.6 | 23.6 | 23.6 | 23.6 | Ester Solvent (boiling point: 240° C.) |
| BYK-052 | 0.4 | 0.4 | 0.4 | 0.4 | Silicone antifoaming agent (BYK) |
| G-410 | 0.5 | 0.5 | 0.5 | 0.5 | Silicone leveling agent (Tego) |
| BYK-2008 | 0.5 | 0.5 | 0.5 | 0.5 | Acrylic dispersant (BYK) |
| PMMA beads (average particle size: 15 μm) | 15 | | | | |
| PMMA beads (average particle size: 20 μm) | | 15 | | | |
| PMMA beads (average particle size: 2 μm) | | | 15 | | |
| Silicone beads (average particle size: 2 μm) | | | | 15 | |
| Total | 100 | 100 | 100 | 100 | |

Further, color-differences (L, a, b), total light transmittance, and haze were measured using a color-difference meter and a haze meter with regard to the samples prepared in Examples 1 and 2 and Comparative Examples 1 and 2, and results are shown in Table 2. The results shown in Table 2 are the values before the light source was turned on, and crystal light was obtained at a total transmittance of 40 or more, an L value of 50 or less and a haze value of 60 or more after the light source was turned on. When the total transmittance was greater than or equal to 50, the L value was less than or equal to 40 and the haze value was greater than or equal to 75, desirable crystal light could be obtained.

TABLE 2

| Item | | Air | Example 1 | Example 2 | Comparative Example 1 | Comparative Example 2 | Remarks |
|---|---|---|---|---|---|---|---|
| Viscosity (cps/25° C.) | | — | 9000 | 8700 | 9800 | 9500 | Brookfield DV-I viscometer |
| Color | L | 0.0 | 35.63 | 33.45 | 35.63 | 70.36 | PMMA light guide plate (1 cm thick) Measurement after 305 mesh screen printing and drying CM-2600D (color-difference meter) Minolta |
| | a | 0.0 | 0.13 | 0.12 | 0.18 | −0.89 | |
| | b | 0.0 | 0.29 | 0.29 | 0.35 | −1.92 | |
| Optical characteristics | Tt (total transmittance) | 100 | 91 | 91 | 90 | 89 | PMMA light guide plate (1 cm thick) Measurement after 305 mesh screen printing and drying Measurement equipment: HAZE Meter (SUGA, Japan) |
| | Haze | 0.0 | 81 | 80 | 35 | 91.2 | |

Although some embodiments have been described herein with reference to the accompanying drawings, it will be understood by those skilled in the art that these embodiments are provided for illustration only and various modifications, changes, alterations and equivalent embodiments can be made without departing from the scope of the invention. Therefore, the scope and sprit of the invention should be defined only by the accompanying claims and equivalents thereof.

INDUSTRIAL APPLICABILITY

The present invention relates to a light-diffusing ink composition, and more particularly, to an ink composition applied to a light guide panel and forming a light-diffusing layer for light emitted from a light source, and a display unit using the same and used for a billboard signboard or the like capable of displaying an image. According to the present invention, light from a light source is converted into a crystal light pattern, thereby producing aesthetic and sensuous light, and aesthetically pleasing lighting can be achieved by the light guide panel using the composition.

The invention claimed is:

1. A light-diffusing ink composition comprising:
   an ink binder including at least one selected from the group consisting of an acrylic resin having an index of refraction of 1.49 and a polyvinyl chloride (PVC) copolymer having an index of refraction of 1.48;
   polymethyl methacrylate (PMMA) particles for forming a crystal light pattern; and
   a solvent for ink including at least one selected from the group consisting of ketones, esters, ethers, hydrocarbons, and glycol ether organic solvents,
   wherein the PMMA particles have an index of refraction of 1.49 and comprise PMMA beads having an average particle size of 13 μm to 30 μm,
   wherein the composition comprises 100 parts by weight to 590 parts by weight of the ink binder and 160 parts by weight to 1000 parts by weight of the solvent for ink, based on 100 parts by weight of the PMMA particles.

2. The light-diffusing ink composition according to claim 1, wherein the PMMA beads have an average particle size of 15 μm to 20 μm.

3. The light-diffusing ink composition according to claim 1, further comprising: a color pigment for imparting color.

4. The light-diffusing ink composition according to claim 3, wherein the color pigment comprises a transparent color pigment.

5. The light-diffusing ink composition according to claim 4, wherein the color pigment is present in an amount of 8 parts weight to 170 parts by weight based on 100 parts by weight of the PMMA particles.

6. The light-diffusing ink composition according to claim 3, wherein the color pigment comprises at least one selected from the group consisting of Quinacridone red C.I. pigment violet 19, C.I. pigment R 177 (red), C.I. Pigment G36 (green), C.I. pigment B15:6 (blue), C.I. Pigment Y139 (yellow), and C.I. Pigment V23 (violet).

7. The light-diffusing ink composition according to claim 6, wherein the color pigment is present in an amount of 8 parts weight to 170 parts by weight based on 100 parts by weight of the PMMA particles.

8. The light-diffusing ink composition according to claim 3, wherein the color pigment is present in an amount of 8 parts weight to 170 parts by weight based on 100 parts by weight of the PMMA particles.

9. A light guide panel comprising:
   a light-diffusing layer formed of the light-diffusing ink composition according to claim 1; and
   a light guide member including the light-diffusing layer formed thereon.

10. The light guide panel according to claim 9, wherein the light guide member comprises a display image formed by the light-diffusing layer on a surface of the light guide member as the light-diffusing ink composition is printed on the surface of the light guide member corresponding to a preset design, and the display image of the crystal light pattern is output in front of the light guide member as the light guide member is illuminated by a light source.

* * * * *